UNITED STATES PATENT OFFICE.

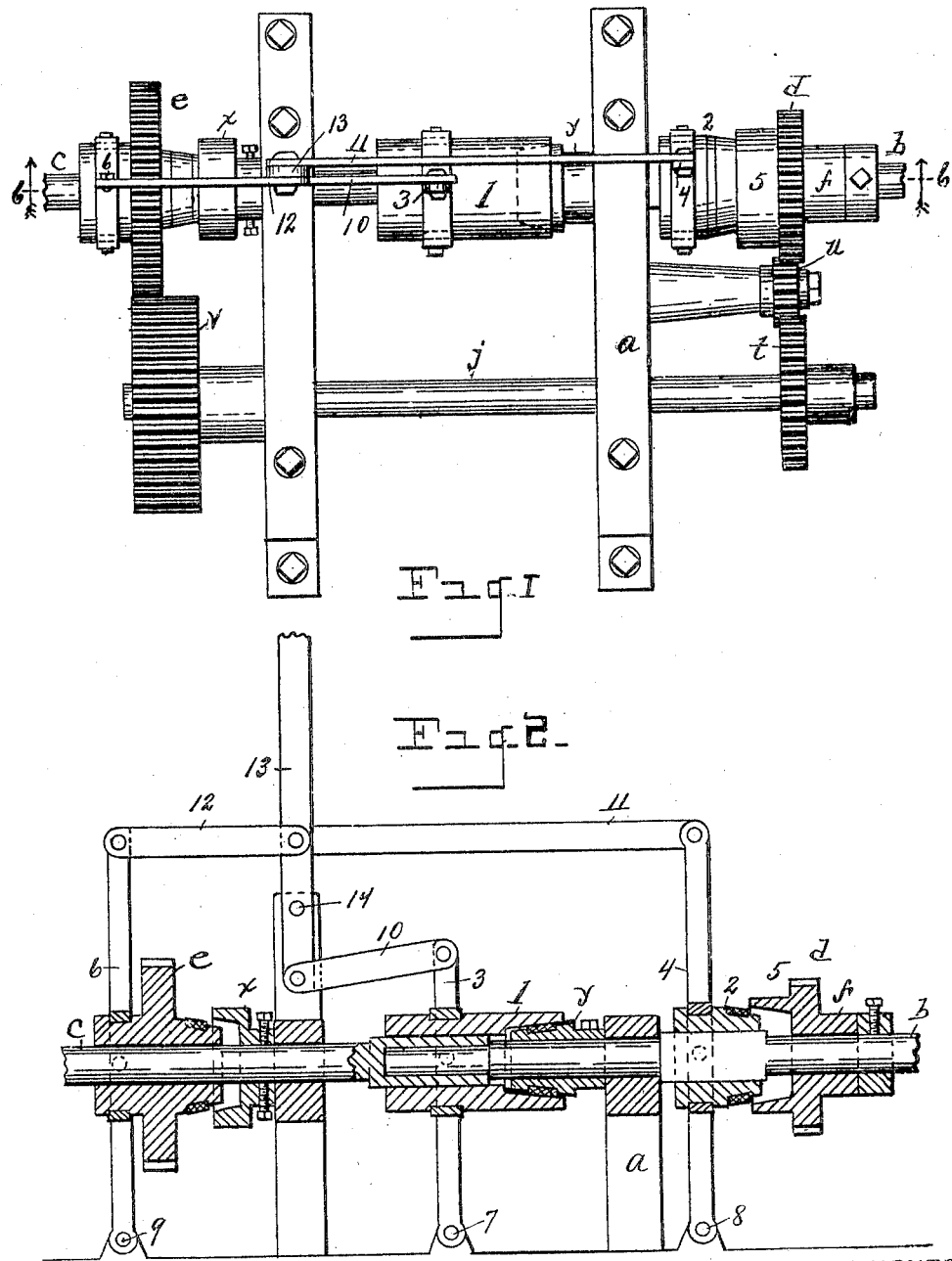

SAMUEL B. DIXON, OF DETROIT, MICHIGAN.

REVERSING MECHANISM.

No. 797,670.　　　　Specification of Letters Patent.　　　　Patented Aug. 22, 1905.

Application filed May 10, 1902. Serial No. 106,713.

*To all whom it may concern:*

Be it known that I, SAMUEL B. DIXON, a citizen of the United States, residing at Detroit, county of Wayne, State of Michigan, have invented a certain new and useful Improvement in Reversing Mechanism, of which the following is a specification, reference being had to the accompanying drawings, which form a part of this specification.

My invention has for its object a novel reversing mechanism applicable to a wide variety of uses; and it consists of the construction, combination, and arrangement of devices and appliances hereinafter described and claimed and illustrated in the accompanying drawings, in which—

Figure 1 is a view in plan. Fig. 2 is a vertical longitudinal section.

The aim of my invention is to provide a reversing mechanism of superior simplicity, economy, and utility. Accordingly, $a$ represents any suitable supporting structure, upon which is journaled a driving-shaft $b$ and a driven shaft $c$. The driving-shaft $b$ may be actuated by any suitable source of power, and the driven shaft may in turn actuate any desired mechanism. Upon the driving-shaft is located a driving-gear $d$, and upon the driven shaft is located a driven gear $e$. The gear $d$ is constructed with an integral hub $f$ to receive the shaft $b$. Upon the supporting structure is journaled an auxiliary shaft $j$, provided with a gear $t$, driven by the driving-gear $d$ in any suitable manner. As shown, an intermediate pinion $u$ is provided, meshing with the gears $d$ and $t$. The auxiliary shaft is provided at its opposite end with a gear $v$, meshing with the driven gear $e$. The gear $d$ is loose upon its shaft.

It will be seen that the driving-shaft $b$ is continuously driven in the same direction, no stopping and starting of the power that propels it being required. Thus, for example, if the driving-shaft $b$ were actuated by an engine the engine may work continuously, my improved reversing mechanism enabling me to change the direction of the driven shaft while the engine is constantly in operation in one direction. For some purposes it is found desirable to throw the gears on the auxiliary shaft $j$ entirely out of rotation in reversing the rotation of the driven shaft to save noise particularly and to get a more direct action of the driving and of the driven shafts $b$ and $c$. To accomplish this result, the gear $e$ is loose upon the shaft $c$ and is also made longitudinally reciprocatory upon its shaft.

The clutch mechanism within the scope of my invention may be variously modified. As embodied herein the clutch mechanism consists of the hubs $x$ and $y$, keyed or otherwise secured to the shafts $b$ and $c$, respectively, and of reciprocatory hubs, (indicated by the numerals 1 and 2,) the movable hub 1 being provided with a lever 3, whereby it may be moved into engagement with the hub $y$. The hub 2 may also be provided with a lever 4, whereby said hub may be moved into engagement with the gear $d$, the gear $d$ being constructed with a collar or flange 5 to engage the hub 2. The hub of the gear $e$ is constructed to engage or clutch the hub $x$ and may be moved into engagement therewith by a lever 6. The levers 3, 4, and 6 are shown fulcrumed, respectively, at 7, 8, and 9. To actuate the clutching devices 1 2 and the gear $e$ simultaneously, their levers 3 and 6 are connected, respectively, by connecting-rods 10, 11, and 12 to an operating-lever 13, fulcrumed, as at 14, to the supporting structure. The shafts $b$ and $c$ have their bearings at their adjacent ends in the clutch or hub 1 in any suitable manner. It will also be obvious that the throwing of the lever 13 in one direction operates both the extreme or outer clutch mechanisms $e$ $x$ 2 5 in like manner to engage the gears $d$ and $e$, in consequence of which the gear $d$ transmits its power to the auxiliary shaft $j$ to rotate the driven shaft $c$, the same movement of the lever 13 opening the center clutch. The opposite movement of the lever 13 opens the outer or extreme clutches and engages the center clutch upon the shafts $b$ and $c$. It will be seen that when the gears $d$ and $e$ are out of engagement with their adjacent clutch mechanisms they will be thrown out of rotation, together with the gears upon the auxiliary shaft.

What I claim as my invention is—

1. A reversing mechanism embodying a supporting structure, a driving-shaft rotatable continuously in the same direction, a driving-gear loosely mounted upon the driving-shaft, a driven shaft, a single driven gear upon the driven shaft, clutch mechanism to engage the driving and the driven gears, and means driven by the driving-gear when in engagement with the corresponding clutch mechanism to rotate the driven gear, the driven gear being reciprocatory and loosely mounted upon the driven shaft.

2. A reversing mechanism embodying a supporting structure, a driving-shaft rotatable continuously in one direction, a driving-gear loosely mounted upon the driving-shaft, a single driven gear loosely mounted and having a reciprocatory movement upon the driven shaft, non-reciprocatory clutch members upon the driving and upon the driven shafts, reciprocatory clutch members upon the driving and upon the driven shafts, means to move the driven gear into engagement with the adjacent non-reciprocatory clutch member, and to simultaneously move one of the reciprocatory clutch members into engagement with the driving-gear, the other reciprocatory clutch member being simultaneously moved out of engagement with the other non-reciprocatory clutch member, the driven gear and one of the reciprocatory clutch members simultaneously movable out of engagement with the adjacent non-reciprocatory clutch member, and the driving-gear respectively, and the other reciprocatory clutch member simultaneously movable into engagement with the other non-reciprocatory clutch member, and means driven by the driving-gear when in engagement with the corresponding clutch mechanism to rotate the driven gear.

In testimony whereof I have signed this specification in the presence of two subscribing witnesses.

SAMUEL B. DIXON.

Witnesses:
 H. P. SUMNER,
 J. M. POLAND.